Aug. 15, 1961  R. G. BROWN ET AL  2,996,268
INERTIAL GUIDANCE SYSTEM
Filed Nov. 25, 1957  2 Sheets-Sheet 1

INVENTORS
Robert G. Brown &
John R. Stuber
BY E. W. Christen
ATTORNEY

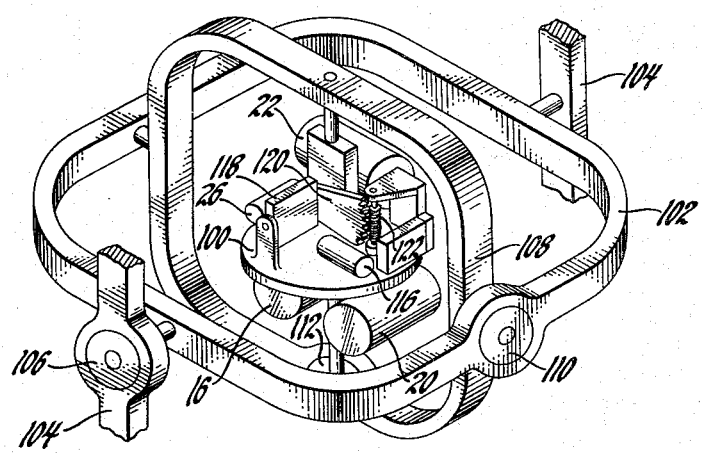

United States Patent Office 2,996,268
Patented Aug. 15, 1961

2,996,268
INERTIAL GUIDANCE SYSTEM
Robert G. Brown and John R. Stuber, Milwaukee, Wis., assignors to General Motors Corporation, Detroit, Mich., a corporation of Delaware
Filed Nov. 25, 1957, Ser. No. 698,871
4 Claims. (Cl. 244—14)

This invention relates to inertial navigation systems and more particularly to an improved navigational reference for controlling the flight of aircraft such as guided missiles.

Inertial navigation is guidance without reference to either the earth or celestial bodies and such systems utilize a navigational reference such as a stable reference platform which is provided within the airframe to furnish reference coordinate axes usually in the form of a gimbal structure. This navigation reference permits aircraft acceleration to be measured and hence aircraft velocity and position may be computed for purposes of indication or control of the aircraft behavior in flight.

For the purpose of terrestial navigation, the coordinate system must be in some known orientation relative to the earth which may be readily established before flight of the aircraft and must be maintained throughout the flight of the aircraft. This is commonly accomplished by utilizing gyroscopes mounted upon a stable reference platform for sensing the random disturbances of the relation between the coordinate axes and the orientation relative to the earth. The gyroscopes develop stabilization signals which through the intermediary of torque motors, interposed between the reference system and the aircraft, null the precessions of the gyroscopes caused by the random disturbances. Accordingly, the reference coordinate axes of the navigational reference system are caused to remain in continuous alignment with the earth's axes which they represent. Additionally, such inertial navigation systems employ accelerometers in connection with the navigational reference system to measure accelerations of the aircraft. Such accelerometers are usually sensitive only along a single axis and are oriented at right angles to each other to measure the total horizontal acceleration of the aircraft relative to the earth. From the acceleration information, the velocity and the position of the aircraft may be computed and accordingly, with a suitable steering system, the flight path of the aircraft may be controlled.

At the present time, a number of inertial system configurations have been proposed to provide navigational reference coordinates. In one local vertical reference system, the gyroscopes and hence the reference axes are aligned with the local vertical and the north and east directions in the horizontal plane. This system, however, requires compensation for meridianal convergence at the poles and restricts the aircraft to non-polar flights. In another local vertical reference system, the selected coordinate axes are the tangent to the great circle passing through the departure and destination points, the local vertical in the plane of the great circle, and the mutual perpendicular. Undesirable features of this system, however, are the requirement of computation of a variable earth rate compensation for the gyroscopes and the fact that computation of aircraft position is dependent upon open-loop integrations. These features subject the system to accumulation of errors. Reference systems have been proposed with coordinate axes parallel respectively to the earth's polar axis and to mutually perpendicular directions in the earth's equatorial plane. With the accelerometers oriented in the north and east directions, the meridianal convergence problem is present. If the great circle orientation is chosen for the accelerometers, an excessively large gimbal package is required. The present invention obviates the difficulties and disadvantages of these proposed system configurations.

In accordance with this invention, a navigational reference system of coordinate axes is employed which is termed herein a departure or launch point vertical reference system. In this system, a physical indication of the vertical at the departure point is maintained in the system throughout the flight of the aircraft. The system is additionally described as a great circle reference system since the gyroscopes are aligned in a fixed orientation with respect to the great circle passing through the departure point and the destination point or target. Therefore, the reference coordinate axes of the system represented by the gyroscope input axes are the departure point vertical, the great circle tangent at the departure point, and the great circle perpendicular or range axis.

Furthermore, in accordance with the invention, the accelerometers are initially aligned with their sensitive axes parallel respectively to the great circle tangent at the departure point and to the great circle perpendicular. During flight, however, the range measuring accelerometer is rotated through the angular distance traversed along the great circle. This is accomplished by use of a drive mechanism on the reference platform to displace the range accelerometer angularly with respect to the platform. This arrangement is highly advantageous in that it permits closed loop computation of missile position which eliminates the accumulation of errors in the position information arising from drifts in the integrating mechanisms which operate on the acceleration signals. Additionally, this arrangement eliminates the need for in-flight computation of earth rate compensation since the earth rate components sensed by the stabilization gyroscopes remain constant throughout flight and may be computed and memorized by the erection system and established prior to flight. The great circle reference, furthermore, avoids the difficulty of accounting for meridianal convergence and the restriction to non-polar flights.

A more complete understanding of this invention may be had from the detailed description which follows taken with the accompanying drawings in which:

FIGURE 3 is a perspective view of the navigation reference system; and

FIGURE 4 is a diagrammatic representation of the range computer.

Figure 1:
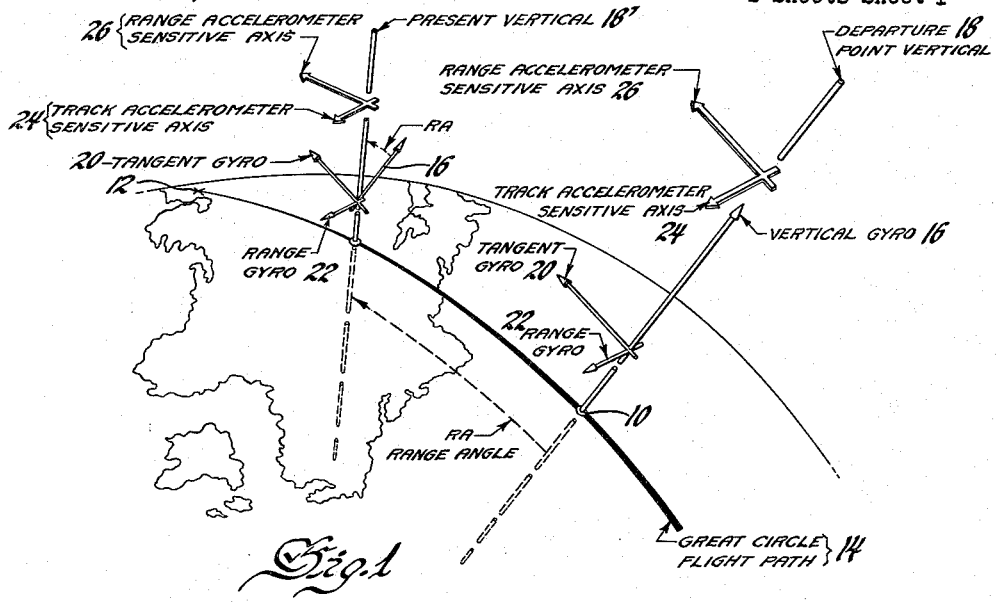
FIGURE 1 is a graphical representation of the navigation reference configuration.

Referring now to the drawings, there is shown an illustrative embodiment of the invention in an intertial guidance system employing a departure point vertical, great circle reference coordinate system. As shown in FIGURE 1, the desired flight path between the departure point 10 and the destination point 12 is established as the great circle 14 interconnecting these points. With the reference system erected and aligned at the departure point 10, the input axis of the vertical gyroscope 16 coincides with the vertical direction 18 at the departure point. The input axis of the tangent gyroscope 20 is aligned parallel to the tangent to the great circle 14 at the departure point 10 and the input axis of the range gyroscope 22 is aligned perpendicular to the great circle 14. Thus, the orientation of the stable reference system is established relative to the earth and will be retained throughout flight of the aircraft. Accordingly, the accelerometers for sensing displacement of the aircraft are disposed relative to the stable reference system with the sensitive axis of the track accelerometer 24 parallel to the input axis of the range gyroscope and with the sensitive axis of the range accelerometer parallel to the input axis of the tangent gyroscope 20. In this system, during flight of the aircraft, only the sensitive axis of the range accelerometer 26 is rotated. The rotation of the sensitive axis of the range accelerometer corresponds with the geocentric angular distance traversed by the aircraft along the great circle 14 which is termed the range angle. Thus, at the range angle RA illustrated in FIGURE 1, the sensitive axis of the range accelerometer 26 is displaced relative to the departure point vertical 18 by the angle RA while the axes of the range, tangent, and vertical gyroscopes and the track accelerometer remain fixed relative to the departure point positions. The sensitive axis of the range accelerometer is thus maintained normal to the local vertical 18′, or in the horizontal plane, throughout the flight of the aircraft.

Figure 2:
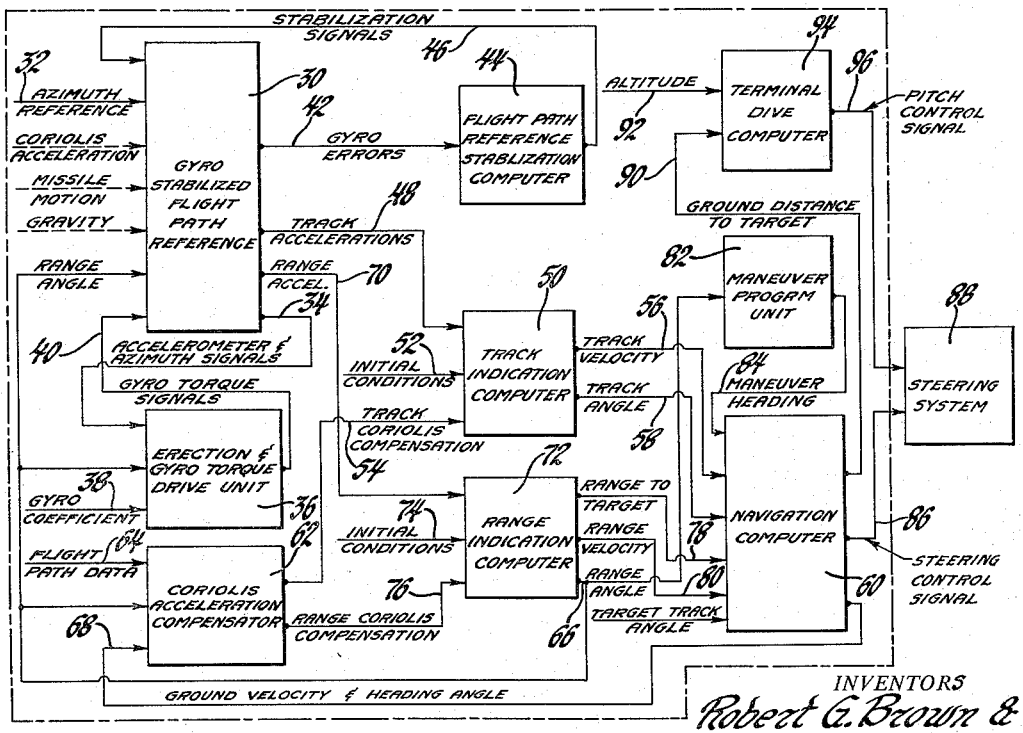
FIGURE 2 is a block diagram of the inertial navigation system.

The mechanization of the system will be described in general with reference to FIGURE 2 wherein it is represented in single line, block diagram fashion. Erection and alignment of the gyroscopically stabilized flight path reference 30 is advantageously accomplished by the use of the accelerometers as vertical indicators and by the use of an external azimuth reference signal 32. Fine erection is performed by connecting the accelerometer and azimuth signals 34 to the erection and gyroscope torque drive unit 36. The gyroscope output and spin axes are so aligned with respect to the vertical that only the tangent gyroscope gravity drift torque will vary significantly in flight and the computation of the compensating torque is continuously computed in the erection and torque drive unit 36 in response to a constant value of the gyroscope coefficient signal 38 and range angle signal 66, the development of which will be described subsequently. The erection and torque drive unit 36 develops the gyroscope torque signals 40 which represent the fixed earth rate compensation torques plus any additional torques needed to compensate for gravity drift at the departure point. The gyroscopes are operative during the erection procedure to develop the gyroscope error signals 42 which are supplied to the stabilization computer 44. The stabilization signals 46 developed thereby are supplied to the torque motors of the flight path reference gimbals to effect final erection of the flight path reference with the coordinate axes of the gyroscopes oriented as described with reference to FIGURE 1.

With the aircraft in flight the gyroscope error signals 42 from the flight path reference 30 are supplied to the stabilization computer 44 and thence to the gimbal torque motors as stabilization signals 46 to maintain the flight path reference coordinate axes in fixed position. The track accelerometer 24 mounted on the flight path reference develops track acceleration signals 48 which are supplied to the track indication computer 50. The track acceleration signals together with initial condition signals 52 and track coriolis compensation signals 54 are combined in the track indication computer 50 to develop the track velocity signal 56 and the track angle signal 58 which are in turn supplied to the navigation computer 60. The coriolis acceleration compensator responds to flight path data signals 64, range angle signal 66, and ground velocity and heading angle signals 68 to develop the desired coriolis compensation signals. Similarly, the range accelerometer 26 mounted on the flight path reference 30 develops the range acceleration signal 70 which is supplied to the range indicator computer 72 together with the initial conditions signal 74 and range coriolis compensation signal 76. The range indication computer operates to develop a range to target signal 78 and range velocity signal 80 which are supplied to the navigation computer 60. The range indication computer also develops a range angle signal 66 which is supplied through the maneuver program unit 82 to the navigation computer as a maneuver heading signal 84. The navigation computer 60 operates in response to the input signals just described to develop a steering control signal 86 which is applied to the steering system 88. Additionally, the navigation computer develops the ground velocity and heading signal 68 for the coriolis acceleration compensator 62 previously mentioned. The navigation computer also develops a ground distance to target signal 90 which together with an altitude signal 92 are applied to the terminal dive computer 94 for developing a pitch control signal 96 which is applied to the steering system 88. The steering control signal 86 controls the heading in accordance with any desired program and the pitch control signal 96 controls the terminal dive initiation point and continuously computes a pitch signal during the terminal dive.

The structure of the gyroscope stabilized flight path reference 30 is shown in FIGURE 3 and since the gyroscope axes are fixed in earth space rather than inertial space only three supporting gimbals are required for the stable platform 100. The outer or pitch gimbal 102 is rotatably supported by trunnions for rotation about the pitch axis by the air frame support structure 104. The pitch gimbal is maintained in fixed position by the pitch torque motor 106 which is energized in accordance with the pitch signal of the stabilization signals 46 derived by appropriately resolving the output signals from the range gyroscope 22 and the tangent gyroscope 20 mounted on the stable platform 100. The intermediate or roll gimbal 108 is supported by trunnions for rotation about the roll axis in the pitch gimbal 102. The roll gimbal is maintained in fixed position by the roll torque motor 110 which is energized in accordance with the roll signal of stabilization signals 46 which is derived by appropriately resolving the output signals from the tangent gyroscope 20 and the range gyroscope 22 mounted on the stable platform 100. The stable platform 100 is mounted by trunnions within the roll gimbal 108 for rotation about the yaw axis. The stable platform 100 is maintained in fixed position by the yaw torque motor 112 which is energized in accordance with the yaw signal of stabilization signals 46 derived from the vertical gyroscope 16 on the stable platform 100. Thus the stable platform 100 is maintained throughout flight of the aircraft in the orientation established at the departure point.

The stable platform 100, as illustrated in FIGURE 3, is adapted to support the accelerometers required for sensing motion of the aircraft in the horizontal plane and may include components (not shown) for sensing motion in the vertical plane. For sensing one component of motion in the horizontal plane, accelerometer 116 is rigidly mounted upon the stable platform 100. For sensing the other component of horizontal motion, the range accelerometer 26 is mounted upon the movable range accelerometer platform 118 which in turn is supported upon the stable platform for rotation relative thereto about the range axis which is parallel to the pitch axis of the aircraft. The range accelerometer platform 118 is rotatably driven through the intermediary of a gear sector 120 and worm gear 122 which in turn is driven by a range angle motor energized by the range indication computer to be described presently.

The range indication computer as shown in FIGURE 4 provides for double integration with respect to time of the range acceleration to obtain successive signals corresponding to range velocity and range distance from aircraft to destination. The computer suitably comprises a pair of servo motor tachometer units to perform the successive integrations in a well known manner. The first integrating unit comprises a servo amplifier 124 which receives an input signal 134 corresponding to range acceleration from the accelerometer 26 and a coriolis acceleration compensating signal 136 from the compensator 62. The servo motor 126 is energized from the servo amplifier 124 and has an output shaft connected with the movable contact 128 of a potentiometer 130 which is energized by a suitable source of reference voltage E. A rate or tachometer generator 132 is driven by the servo motor 126 to develop a rate signal 138 which is applied to the input of the servo amplifier. An initial adjustment of the position of the movable contact 128 is provided by the control mechanism 140 in accordance with any initial range velocity of the aircraft. Accordingly, the potentiometer movable contact 128 is displaced in accordance with the first time integral of the range acceleration and thus develops an electrical signal corresponding to the range velocity of the aircraft. The range velocity signal 142 is applied as an input signal to the succeeding integrating unit which comprises the servo amplifier 144 and a servo motor 146. The servo motor drives the tachometer or rate generator 148 which supplies a rate signal to the input of the servo amplifier 144. The output shaft 150 of the servo motor 146 is displaced in accordance with the second time integral of the acceleration signal. The initial value of the range angle of the aircraft from the departure point is set into the computer by mechanism 152 which adjusts the initial angular position of the shaft 150. The angular position of the shaft 150 thus corresponds to the instantaneous value of the range angle of the aircraft and is supplied as one input to the mechanical differential 154. The total range angle between the departure point and destination point is introduced into the computer by the mechanism 156 which provides the other input to the differential 154. The output shaft of the differential 154 drives the movable contact 158 of the potentiometer 160 which is excited with a suitable source of reference voltage. Thus the movable contact 158 is displaced from its reference position an amount corresponding to the instantaneous value of the range distance from the aircraft to the destination point. This range to target signal 78 derived from the potentiometer 160 is applied to the navigation computer 60. The output shaft 150 of the servo motor 146 is caused to assume an angular position corresponding to the range angle of the aircraft and is coupled by the shaft 162 to the worm gear 122 through any suitable interconnecting means, not shown. Accordingly, the range accelerometer platform 118 is angularly displaced about the range axis an amount corresponding to the aircraft range angle from the departure point.

In operation of the navigation system the reference coordinate system represented by the stable platform 100 is erected and aligned at the departure point as previously described. Upon flight of the aircraft, the stable platform 100 is maintained in its initial orientation relative to the earth axes which it represents. Thus a physical representation of the departure point vertical is maintained in the system throughout flight of the aircraft. Accordingly, the range accelerometer platform 118 must be driven angularly in accordance with range angle to maintain the sensitive axis in the horizontal plane. The range accelerometer signal is supplied to the range indication computer 72 for double integration thereby to derive the range angle or position information corresponding to the instantaneous position of the aircraft. Since this range angle information represented by the angular position of shaft 162 is used to angularly displace the range accelerometer platform 118 the computation of aircraft position is accomplished by closed loop integrations. Therefore, any drifts in the integrators merely cause oscillation of the indicated range or position about the actual value and there is no accumulation of errors in the position information. Furthermore, since the gyroscopes are oriented in fixed relation to the departure point vertical throughout flight rather than being fixed relative to the local vertical it is unnecessary to compute variable gyro earth rate compensation as a function of position along the flight path.

Although the description of this invention has been given with respect to a particular embodiment, it is not to be construed in a limiting sense. Many variations and modifications within the spirit and scope of the invention will now occur to those skilled in the art. For a definition of the the invention, reference is made to the appended claims.

We claim:

1. A navigational reference system for aircraft comprising a stable reference coordinate system, means for maintaining said coordinate system throughout flight of the aircraft in a fixed angular orientation relative to the earth at the departure point of the aircraft, motion responsive means having its input axis initially aligned in a known direction relative to the coordinate system and the earth for developing a signal corresponding to motion of the aircraft in a horizontal plane, and means responsive to said signal for displacing said motion responsive means relative to said reference coordinate system so that said input axis remains in the initially aligned direction relative to the earth.

2. A navigational reference system for aircraft comprising, a reference plaform, means for orienting said platform relative to the earth at the departure point of the aircraft, means for stabilizing said platform in the oriented position throughout flight of the aircraft, acceleration responsive means mounted on said platform and having its input axis aligned in a horizontal plane for developing a signal corresponding to acceleration of the aircraft in a horizontal plane, and means responsive to the second time integral of said acceleration signal for displacing said acceleration responsive means relative to said platform to maintain said input axis in the horizontal plane during flight of the aircraft.

3. A guidance system for aircraft comprising a support structure adapted for mounting within an aircraft, a stable platform supported from said structure for rotational displacement about three mutually orthogonal axes, said axes being aligned parallel respectively with the great circle flight path from departure to destination, the direction of the vertical at the departure point, and the great circle perpendicular, gyroscopic means mounted on said platform and responsive to displacement about said axes for developing error signals, stabilization means responsive to said error signals and connected with said support structure for maintaining said axes in fixed position throughout flight of the aircraft, acceleration responsive means movably mounted upon said platform with its sensitive axis parallel to the great circle flight path for developing a range acceleration signal, integrating means connected with the acceleration responsive means, and drive means interconnecting said integrating means and said acceleration responsive means for angularly displacing the sensitive axis at the same rate as the aircraft traverses the great circle flight path.

4. A guidance system for aircraft comprising a support structure adapted for mounting on an aircraft, a stable platform supported by said structure for rotational displacement about yaw, roll, and pitch gimbal axes, gyroscopes corresponding to the vertical, tangent, and range reference coordinate axes mounted on said platform, means for erecting said gyroscopes at the aircraft departure point with the gyroscope input axes aligned respectively with the departure point vertical direction, the tangent, at the departure point, to the great circle flight path interconnecting the departure point and destination point, and the mutual perpendicular, said erecting means establishing a fixed earth rate compensation for said gyroscopes, stabilization means connected with said gyroscopes and connected with said support structure for maintaining said input axes in fixed position throughout flight of the aircraft, acceleration responsive means movably mounted on said platform with its sensitive axis parallel to the great circle flight path for developing a range acceleration signal, integrating means connected with the acceleration responsive means, and drive means interconnecting said integrating means and said acceleration responsive means for angularly displacing the sensitive axis at the same rate as the aircraft traverses the great circle flight path.

References Cited in the file of this patent

UNITED STATES PATENTS 2,762,123    Schultz _____ Sept. 11, 1956

OTHER REFERENCES

Aviation Week, Jan. 9, 1956, pp. 42, 43, 45–47, 94–99, 101, 105, 106 and 107.